(12) United States Patent
Scheding et al.

(10) Patent No.: US 12,161,129 B2
(45) Date of Patent: Dec. 10, 2024

(54) HANGING LINE WITH SMOKING ROD LENGTH MEASUREMENT

(71) Applicant: POLY-CLIP SYSTEM GMBH & CO. KG, Hattersheim (DE)

(72) Inventors: Markus Scheding, Hochheim (DE); Manfred Waldstädt, Mainz (DE)

(73) Assignee: POLY-CLIP SYSTEM GMBH & CO. KG, Hattersheim (DE)

( * ) Notice: Subject to any disclaimer, the term of this patent is extended or adjusted under 35 U.S.C. 154(b) by 0 days.

(21) Appl. No.: 18/195,672

(22) Filed: May 10, 2023

(65) Prior Publication Data

US 2023/0363400 A1 Nov. 16, 2023

(51) Int. Cl.
*A22C 15/00* (2006.01)

(52) U.S. Cl.
CPC .......... *A22C 15/002* (2013.01); *A22C 15/007* (2013.01)

(58) Field of Classification Search
CPC ... A22C 15/002; A22C 15/001; A22C 15/005; A22C 15/007; A22C 15/008
USPC .......................................................... 452/51
See application file for complete search history.

(56) References Cited

U.S. PATENT DOCUMENTS

2014/0378959 A1* 12/2014 Spertell .................. A61N 5/025
606/33

FOREIGN PATENT DOCUMENTS

| EP | 2384638 A1 | 11/2011 |
|---|---|---|
| EP | 3241447 A1 | 11/2017 |
| EP | 3732982 A1 | 11/2020 |

OTHER PUBLICATIONS

EPO; Application No. 22172758.9; Extended European Search Report dated Oct. 14, 2022.

* cited by examiner

*Primary Examiner* — Richard T Price, Jr.
(74) *Attorney, Agent, or Firm* — Fitch, Even, Tabin & Flannery LLP (57) ABSTRACT

A method for handling longitudinal smoking rods for storing sausage-shaped products, comprising the steps of: providing a plurality of the rod-like elements having a length; providing a clipping machine configured to produce the sausage-shaped products; providing a hanging line configured to load the produced sausage-shaped products on the rod-like elements and comprising a measuring position for measuring the length of the rod-like elements, and a loading position for loading the sausage-shaped products on the rod-like elements; feeding one of the rod-like elements to the measuring position of the hanging line; measuring the length of the rod-like element; determining whether the length is within a tolerance range of a desired length; loading a predetermined number of the produced sausage-shaped products on the rod-like element, if the length is within the tolerance range; and discarding the rod-like element from the hanging line, if the length is not within the tolerance range.

15 Claims, 9 Drawing Sheets

HANGING LINE WITH SMOKING ROD LENGTH MEASUREMENT

CROSS-REFERENCE TO RELATED APPLICATION

The present application claims benefit of priority of European Patent Application No. 22172758.9 filed on May 11, 2022, the content of which is incorporated herein by reference in its entirety.

FIELD OF THE INVENTION

The present invention relates to a system for producing sausage-shaped products each of which contain a flowable filling material in a tubular or bag-shaped packaging casing and a suspension element. In particular, the inventive system includes a clipping machine and a hanging line capable of measuring the length of the smoking rods.

BACKGROUND OF THE INVENTION

In the production of sausage-shaped products, like sausages, a filling material is fed by a filling machine through a filling tube of the clipping machine into a tubular casing material. After a predetermined volume of filling material has been filled into said tubular casing material, the clipping machine closes the back end of the sausage-shaped product via a closing means, like closure clips, which are attached by respective closing tools. A suspension element, like a suspension loop, may also be attached to said back end of said sausage-shaped product, enabling the sausage-shaped product to be hung up e.g. on a smoking rod or the like. Afterwards, the sausage-shaped product just produced, is separated from the remaining casing material by a knife or the like of a cutting device of the clipping machine and is transferred out of the clipping machine to a hanging line.

For loading (storing) the sausage-shaped product on a smoking rod, the smoking rod usually is provided in a loading position within the hanging line. Then, when the produced sausage-shaped product is removed from the clipping machine, the suspension loop is engaged by a transfer device and is threaded onto the smoking rod. When the smoking rod is filled with a desired number of sausage-shaped products, the filled smoking rod is moved out of the loading position and an empty smoking rod is placed to be filled next. Then the filled smoking is transferred out of the hanging line by an outfeed device to be supplied to the next treatment step or to a storage device such as a storage frame or a smoking carriage or the like.

EP 2 384 638 B1 describes a system for producing sausage-shaped products, which comprises a robot device for inserting and removing, i.e. handling or transferring, of filled smoking rods from a hanging line to a storage frame. In the field of production of sausage-like products, there is a great variety of machines being components of the respective production line. Said machines may vary in size, in rate of production or in size of products. Thus, they also may vary in the kind of used rod-like elements, on which the sausage-like products are to be loaded and in the kind of storage frames, to which the rod-like elements are to be transferred. Usually, in a production site for producing sausage-like products, different kinds of machines for different products having different sizes are used, so that also different kinds of rod-like elements are simultaneously used at a production site. Accordingly, it cannot be ruled out that erroneously an unsuitable rod-like element is supplied to a hanging line of a clipping machine. In particular when the rod-like element has a axial length deviating from a desired length too much, problems may occur during handling of the rod-like element or during a subsequent treatment process. For example, both end portions of the rod-like elements may be placed on two support bars of a storage frame such that the ends overlap the support bars. When the rod-like element is too short, it may overlap supporting bars of a storage frame only by a small amount. When rolling the storage frame over the floor, vibrations of the storage frame may cause the rod-like element to move in axial direction, so that the risk of sliding off from the support bars increases in case of too short rod-like elements. As another problem, rod-like elements having an unsuitable length (i.e. too short or too long) may be stuck in the hanging line when filled with sausage-shaped products. As a result, interruptions of the processing and damaging of produced sausage-shaped products may occur.

SUMMARY OF THE INVENTION

Therefore, it is an object of the invention to provide a method and a system for handling rod-like elements in a system for producing sausage-shaped products, which ensure an improved reliability of operation and avoid the above problems.

The aforesaid object is achieved by a method for handling longitudinal rod-like elements as defined in independent claim 1, and by a system for producing sausage-shaped products as defined in independent claim 10. The aforesaid object with respect to the system for controlling a robotic device is achieved by the features of claim 10. Advantageous configurations and further developments of the invention with regard to the method are described in dependent claims 2 to 9, and with regard to the system in dependent claims 11 to 15.

In the present invention, a method is provided for handling longitudinal rod-like elements, in particular smoking rods, for storing sausage-shaped products, in particular sausages, in a system for producing and handling the sausage-shaped products, wherein the method comprises the steps of: providing a plurality of the rod-like elements, each rod-like element having a length defined between a first end and a second end; providing a clipping machine configured to produce the sausage-shaped products; providing a hanging line configured to load the produced sausage-shaped products on the rod-like elements and comprising a measuring position for receiving the rod-like elements and for measuring the length of the rod-like elements, and a loading position for receiving the rod-like elements and for loading the produced sausage-shaped products on the rod-like elements; feeding one of the rod-like elements to the measuring position of the hanging line; measuring the length of said one of the rod-like elements; determining whether the length is within a tolerance range of a desired length; providing said one of the rod-like elements in the loading position of the hanging line and loading a predetermined number of the produced sausage-shaped products on said one of the rod-like element, if the length is within the tolerance range; discarding said one of the rod-like elements from the hanging line, if the length is not within the tolerance range. In this manner, advantageously unsuitable rod-like elements can be separated our from the production process, before loaded with sausage-shaped products. In some embodiments, a control unit controlling the clipping machine and the hanging line may indicate to a user that a rod-like element is discarded, so that the user may remove the unsuitable rod-like element.

In some preferred embodiments, optionally, the hanging line further comprises a magazine for holding available the plurality of the rod-like elements, wherein the measuring position of the hanging line is located within the magazine, and wherein the step of discarding comprises removing the one of the rod-like elements from the measuring position directly into a reject bin. Hence, removal of unsuitable rod-like elements into a reject bin may be performed automatically, and no intervention of a user is required. Advantageously, the discarded rod-like elements do not need to travel to the loading position and the whole way through and out of the hanging line, which saves time and helps avoiding any interruption of the production operation.

In some preferred embodiments, optionally, in the hanging line the measuring position and the loading position are one and the same, so that the step of measuring is performed with the one of the rod-like elements placed in the loading position. This is in particular advantageous, since the step of measuring is performed immediately before the step of loading, so that an additional transfer operation from a measuring position to a loading position can be omitted.

In the above embodiment, optionally, the hanging line further comprises an outfeed device, wherein the method further comprises the step of moving the one of the rod-like elements by the outfeed device from the loading position to an output position. This outfeed device advantageously provides the above mentioned normal way of outputting the rod-like element. In this way, a filled rod-like element can be easily taken away from a robot, for example, in order to transfer it to the next treatment step or to a storage device. Optionally, in this case, the step of discarding comprises removing the one of the rod-like elements from the output position, either manually by a user or automatically by a robot.

In some preferred embodiments, optionally, the step of discarding further comprises stopping the operation of the clipping machine until a next one of the rod-like elements has been placed in the loading position of the hanging line and its length has been determined to be within the tolerance range. This is advantageous, since it ensures reliable operation of the system, even if a plurality of unsuitable rod-like elements has been filled into the magazine, for example, so that it takes some time until the next suitable rod-like element arrives in the loading position of the hanging line.

In the above embodiment, optionally, the step of discarding further comprises deferring the step of feeding the next one of the rod-like elements to the loading position of the hanging line until a user manually removes the discarded rod-like element and confirms the removal to the system. In case the discarded rod-like elements are not automatically removed from an output position of the outfeed device, the system indicates to the user that a discarded rod-like element must be removed and separates out from the production process, wherein the user acknowledges removal to the system so that the system can resume operation.

In some preferred embodiments, optionally, the system further comprises a handling robot configured to grip and move the one of the rod-like elements, wherein the handling robot grips the rod-like element, which is loaded with the predetermined number of the produced sausage-shaped products, and places the rod-like element in a storage frame, if the length is within the tolerance range; wherein the step of discarding further comprises removing the discarded rod-like element from the output position and placing the same in a reject bin by the handling robot. In this way, separating out the unsuitably rod-like elements is performed automatically and quickly, so that an advantageous continuous production process can be achieved, in particular if only single unsuitable rod-like elements are occasionally supplied to the hanging line.

In the above embodiment, optionally, the storage frame comprises two support bars having a distance smaller than the desired length, and wherein if the length is within the tolerance range, the handling robot places the one of the rod-like elements on the support bars and perpendicular to the same such that both ends overlap the support bars by the same amount. Since a tolerance range around the desired length is admissible, it is advantageous to take into account the varying length of the rod-like elements when placing them on the support bars of the storage frame, so that the risk of sliding off from the support bars is minimized, even if the storage frame is subject to vibrations or shocks.

In the present invention, a system is provided for producing sausage-shaped products, like sausages, containing a flowable filling material in a tubular or bag-shaped packaging casing and a suspension element such as a suspension loop, and for loading the produced sausage-shaped products on rod-like elements, such as smoking rods, each rod-like element having a length defined between a first end and a second end. The system comprises: a clipping machine configured to produce the sausage-shaped products; a hanging line configured to load the produced sausage-shaped products on the rod-like elements; and a control unit controlling the operation of the clipping machine and the hanging line. The hanging line comprises: a first support element configured to receive the first end of one of the rod-like elements and a second support element configured to receive the second end of the one of the rod-like elements, the first and second support elements defining a measuring position; and a third support element configured to receive the first end of the one of the rod-like elements and a fourth support element configured to receive the second end of the one of the rod-like elements, the third and fourth support elements defining a loading position for loading the produced sausage-shaped products on the rod-like elements; a sensor device arranged at the measuring position and configured to measure the length of the one of the rod-like elements placed in the measuring position; wherein the control unit is configured to compare the length with a desired length and to determine whether the length is within a tolerance range of the desired length, and wherein the control unit further causes the hanging line to load a predetermined number of sausage-shaped products on the one of the rod-like elements if the length is within the tolerance range, and causes discarding the one of the rod-like elements if the length is not within the tolerance range.

In the above embodiment, optionally, the hanging line further comprises a magazine for holding available a plurality of the rod-like elements, wherein the first and second support elements defining the measuring position are located within the magazine, and wherein the magazine is configured to successively feed single rod-like elements first to the measuring position and then to the loading position or to a reject bin. To this, the magazine may have two output paths which can be switched automatically, so that the removal of unsuitable rod-like elements into a reject bin may be performed automatically, and no intervention of a user is required. The reject bin may be located beneath one of these output paths, so that the discarded rod-like can fall into the reject bin.

In some preferred embodiments, optionally, the first and third support elements are one and the same and the second and fourth support elements are one and the same, so that the measuring position is identical with the loading position and the sensor device is arranged at the loading position; and wherein the hanging line further comprises an outfeed device configured to move the one of the rod-like elements from the loading position to an output position. This is particularly advantageous, since this saves space and components in the hanging line, and the unsuitable rod-like elements can be discarded by removing it along the normal way and the magazine can be constructed more simple. Alternatively, it is also possible to provide a reject mechanism configured to reject unsuitable rod-like elements from the loading position directly into the reject bin, for example in a direction away from the outfeed device.

In some preferred embodiments, optionally, the system further comprises a storage frame having two support bars with a distance smaller than the desired length for carrying a plurality of the rod-like elements; and a handling robot configured to grip the one of the rod-like elements and to place it on the support bars of the storage frame or in a reject bin); wherein the handling robot is further configured to receive the measured length of the one of the rod-like elements from the control unit and to adjust the placing position of the one of the rod-like elements on the support bars such that both ends overlap the support bars by the same amount.

In some preferred embodiments, optionally, the sensor device comprises a pushing device arranged at the third support element and having a ram configured to push against the first end in a longitudinal direction of the one of the rod-like elements, so that the second end becomes aligned with the fourth support element acting as a stop; wherein the pushing device comprises a sensor configured to detect a position of the ram and to generate an output signal depending on the position of the ram; and wherein the control unit is configured to receive the output signal of the sensor and to determine the length of the one of the rod-like elements based on the signal when the second end is aligned with the fourth support element. In this embodiment, optionally, the pushing device comprises a pneumatic cylinder fixedly attached with respect to the third support element and a piston having a magnetic element and coupled to the ram, and wherein the sensor is a magnetic sensor, in particular a Hall-Sensor, attached to the pneumatic cylinder and configured to detect an axial position of the piston. This arrangement provides a simple and reliable mechanism for measuring the length of the rod-like elements. Moreover, in case that the measuring position is identical to the loading position, a step of aligning the rod-like element for the loading operation can be advantageously performed simultaneously with the step of measuring.

The inventive method thereby provides all advantages explained in conjunction with the inventive system for producing sausage-shaped products.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
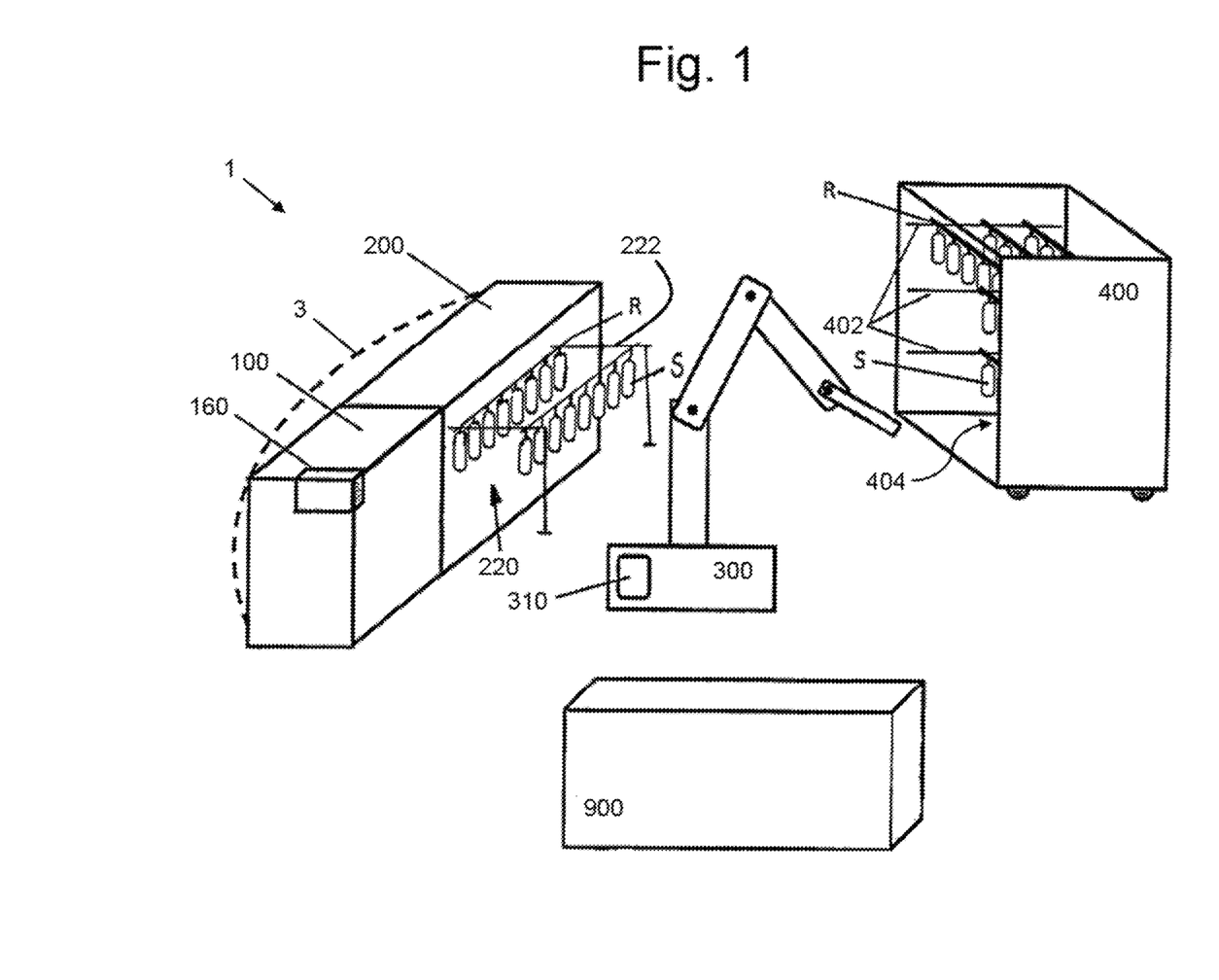
FIG. 1: is a schematic view showing the principal design of a system for producing sausage-shaped products.

An embodiment of a system for producing and handling sausage-like products according to FIG. 1 comprises as main components a schematically shown production line 3 for producing sausage-like products S, like sausages, and storing them on rod-like elements R, like smoking rods, including a control unit 160 for controlling the production line 3, a handling robot 300 having a control unit 310 for controlling the movement of robot 300, and a storage frame 400, into which the sausages S hung up at the smoking rods R are to be moved. It must be noted, that the robot 300 is not obligatory for the invention, and that the rod-like elements can also be manually moved by a user. Optionally, a reject bin 900 may be provided into which a user or robot 300 may place rod-like elements which are discarded, as described later.

Production line 3 comprises a clipping machine 100 for producing the sausage-like products S and an automatic hanging line 200 for loading (storing) the produced sausage-like products S on the smoking rods (rod-like elements) R. Hanging line 200 preferably includes or is combined with an outfeed device 220 having horizontal rails 222 for supporting the rod-like elements R which carry sausage-like products S and leave hanging line 200.

Control unit 160 of production line 3 and control unit 310 of robot 300 may communicate with each other via common techniques like wireless connections or wired connections, in order to coordinate the operations.

When operating the system, storage frame 400 is positioned in an operating range of handling robot 300. Inside storage frame 400, tray rails or shelf rails e.g. in the form of horizontally aligned support bars 402, 404 are arranged for positioning smoking rods R thereon.

Handling robot 300 preferably is a so called joined-arm robot. Construction and operation of such robot 300 in such system is described in detail in EP 2 384 638 B1.

Figure 2:
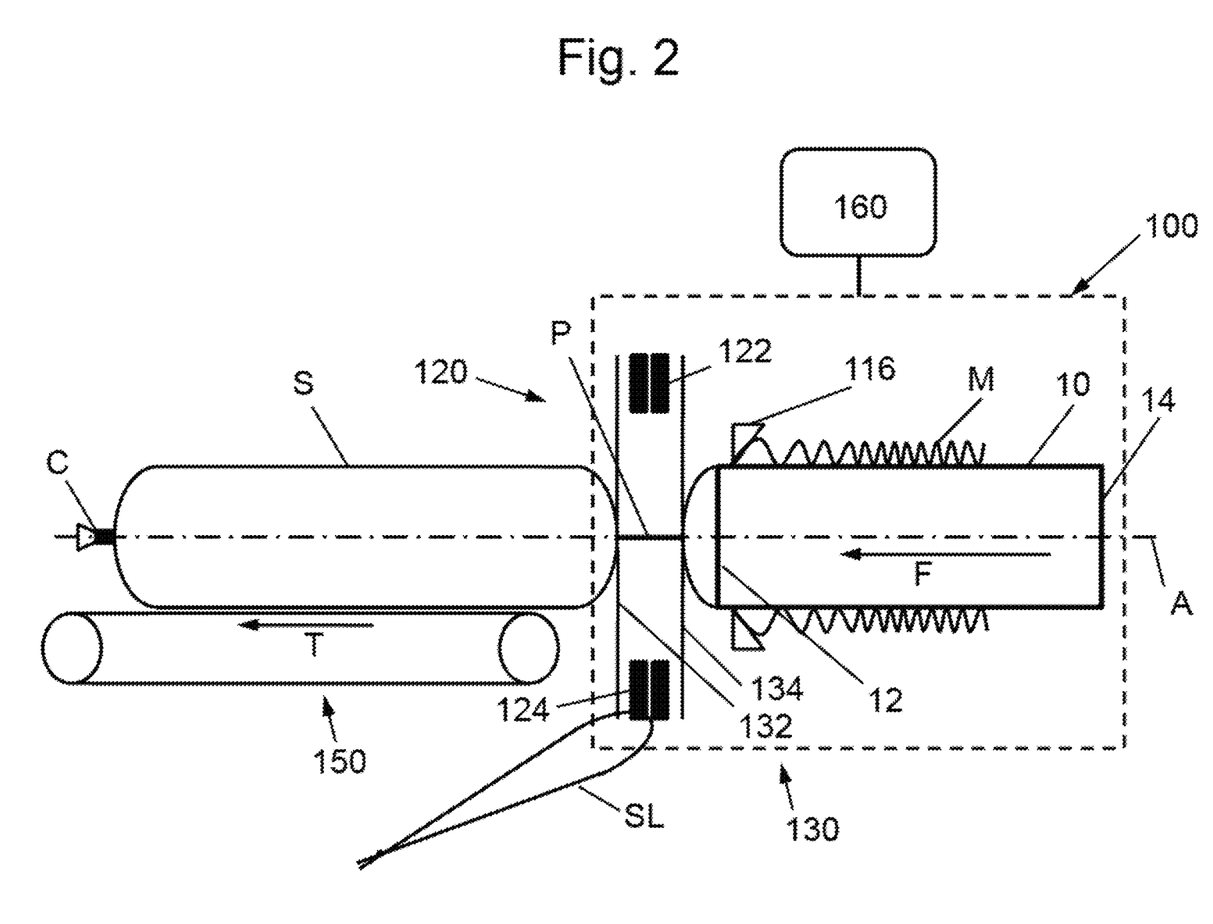
FIG. 2: is a schematic view showing the principal design of a clipping machine of the system of FIG. 1.

A clipping machine 100 for producing sausage-shaped products S is schematically shown in FIG. 2, and comprises as main components a filling tube 10 having a longitudinally extending center axis A and with a discharge opening for a filling material at its left end 12 and a feeding opening for the filling material fed to the filling tube 10 by a feeding pump at its right end 14, a casing brake assembly 16 arranged coaxially with filling tube 10 in the region of the left end 12 of filling tube 10. Filling tube 10 is made of a suitable material, like stainless steel. A supply of tubular packaging casing material M made of a thin sheet material is stored on the filling tube 10. From the supply of tubular packaging casing material M, a single packaging casing is pulled-off during the process of manufacturing the sausage-shaped products S, while the tubular packaging casing material M is retarded by a casing brake 116. Clipping machine 100 further comprises a clipping device 120 for closing a filled tubular packaging casing M by applying closure means, like closure clips C, to a plait-like portion P, and gathering means 130 for gathering the filled tubular packaging casing M and for forming said plait-like portion P thereto, and which are all arranged downstream filling tube 10.

Right end 14 of horizontally arranged filling tube 10 is coupled to a filler arrangement (not shown) including a pump for feeding filling material through filling tube 10 in a feeding direction F into tabular packaging casing M closed on its front end facing in the feeding direction F, by a closure clip C.

As it can be inferred from FIG. 2, positioned immediately downstream left end 12 of filling tube 10, clipping device 120 is arranged and coaxially aligned to filling tube 10. Clipping device 120 comprises a first and a second clipping tool 122, 124 formed by a punch 122 and a die 124. It has to be noted that punch 122 and die 124 may apply and close a single closure clip C for closing the just filled tubular packaging casing M, or may apply and close two closure clips C at the same time, a first closure clip C for closing the just filled tubular packaging casing M for forming a sausage-shaped product S, and a second closure clip C for closing the front end of the tubular packaging casing M subsequently to be filled. Gathering means 130 includes a first displacer unit 132 and a second displacer unit 134, wherein first displacer unit 132 is positioned downstream second displacer unit 134. First and second clipping tools 122, 124 of clipping device 120 may be positioned between first and second displacer units 132, 134, at least for applying and closing one or two closure clips C to plait-like portion P.

If it is desired to suspend sausage-shaped product on a rod-like element, like a smoking rod, e.g. for further treatment, a suspension element, like a suspension loop SL, may be provided such that suspension loop SL is attached to sausage-shaped product S by means of one of closure clips C. According to FIG. 1, suspension loop L is provided in the movement path of die 124 such that suspension loop L is engaged by a closure clip C halt in die 124 to be applied to plait-like portion P and attached thereto together with closure clip C. Clipping machine 100 further comprises a conveying device 150 for conveying sausage-shaped product S towards hanging line 200.

Figure 3:
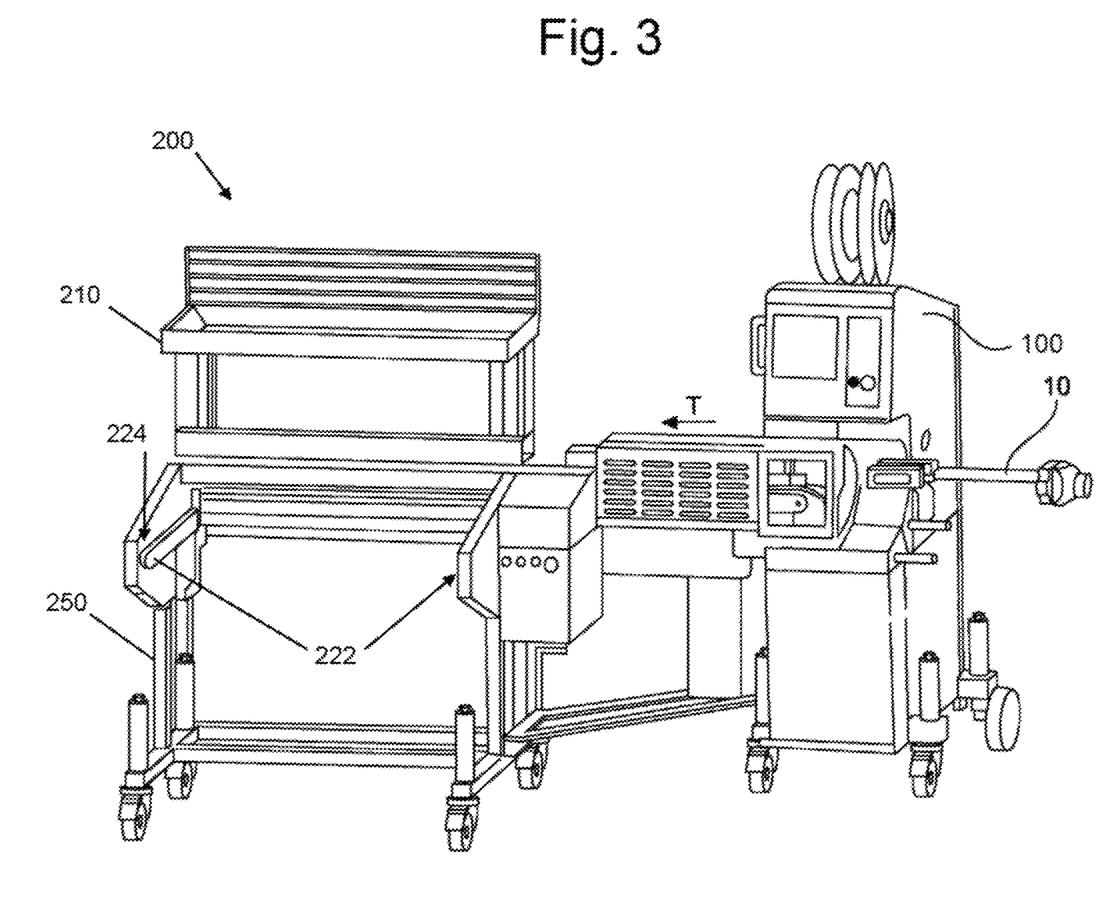
FIG. 3: is a schematic perspective view showing a production line according to the invention.

FIG. 3 shows a schematic perspective overview of a production line 3 according to the invention. In this production line 3 clipping machine 100 is combined with hanging line 200. The produced sausage-shaped products S leaving clipping machine 100 in transfer direction T, as indicated by arrow T in FIG. 3, are received from automatic hanging line 200, which is shown only schematically in an overview with some components (e.g. the loading device) omitted, in order to enhance clarity. Hanging line 200 receives the sausage-shaped products S from clipping machine 100 and rod-like elements R from a magazine 210, for example, which is attached to a frame 250 of hanging line 200. Hanging line 200 preferably comprises an outfeed device 220 which comprises two horizontally arranged rails 222 for supporting the rod-like elements R leaving a loading position of hanging line 200 to an output position 224 located at the outermost ends of rails 222 (i.e. the front ends in FIG. 3). In FIG. 3, the loading position (not depicted since the loading device 260 is not shown) resides on the opposite, i.e. inner ends of rails 222.

Figure 4:
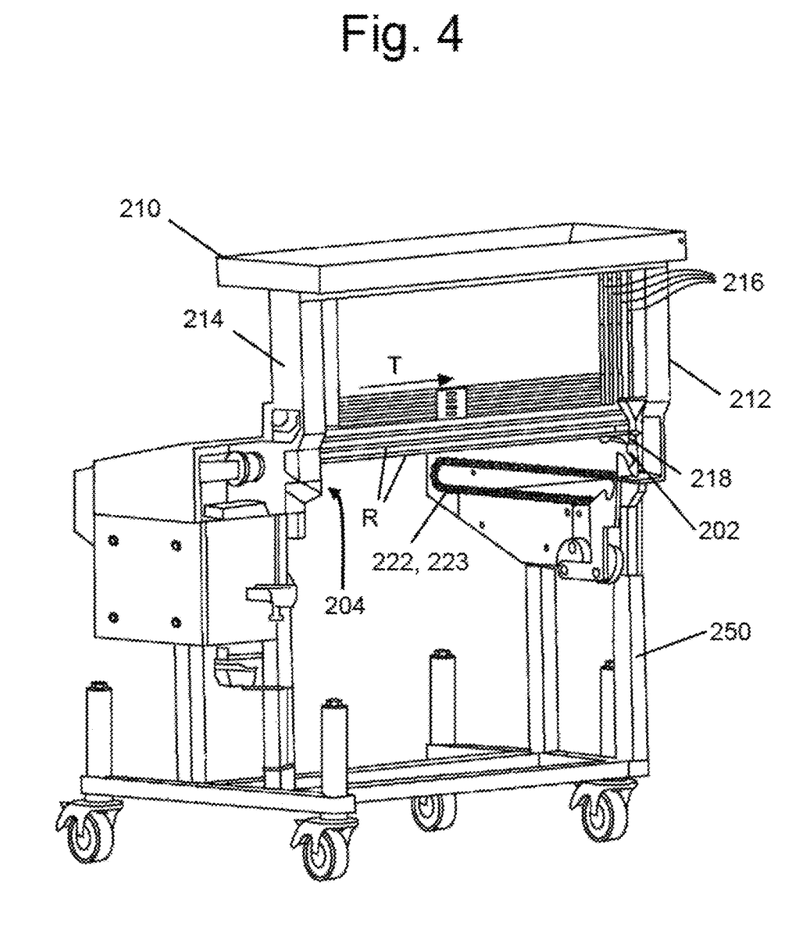
FIG. 4: is a schematic perspective rear view of a part of a hanging line including a magazine for rod-like elements according to a first embodiment of the invention.

As shown in FIG. 4, each rail 222 of outfeed device 220 comprises a circulating chain 223 configured to engage and move one of the ends E1, E2 of rod-like element R towards the output position. As shown in FIG. 4, magazine 210 may comprise an upstream wall 212 and a downstream wall 214 (with respect to the transfer direction T), which are arranged parallel to each other and approximately vertically above rails 222. The distance between walls 212, 214 corresponds to the desired length of a rod-like element R plus a margin. In the surfaces of walls 212, 214 facing each other, vertical slots 216 are arranged parallel to each other. Slots 216 extend from the upper end of walls 212, 214 and commonly end in a funnel-shaped recess (not shown). Rod-like elements R fed into magazine 210 move into slots 216 and sequentially move to the funnel-shaped recess. Magazine 210 further comprises releasing means (not shown) for blocking the rod-like elements R positioned in slots 216, and for selectively releasing a single rod-like element R from one of slots 216 at the lower ends of slots 216. At the lower end of each funnel-shaped recess, a single slot 218 is arranged into which single rod-like element R is moved after being selectively released from slots 216. Slots 218 provide a standby position in which a single, empty rod-like element R is kept ready for being fed into the loading position after a filled rod-like element R has been removed out of the loading position.

Immediately below single slots 218, second blocking and releasing elements 434 in the form of release pins are arranged for securing a single rod-like element R in the standby position, and for releasing rod-like element R for further feeding towards the loading position.

The general construction and operation of magazine 210 and outfeed device 220 are known and described in EP 3 241 447 A1 in detail, so that a more detailed description is omitted here.

Figure 7:
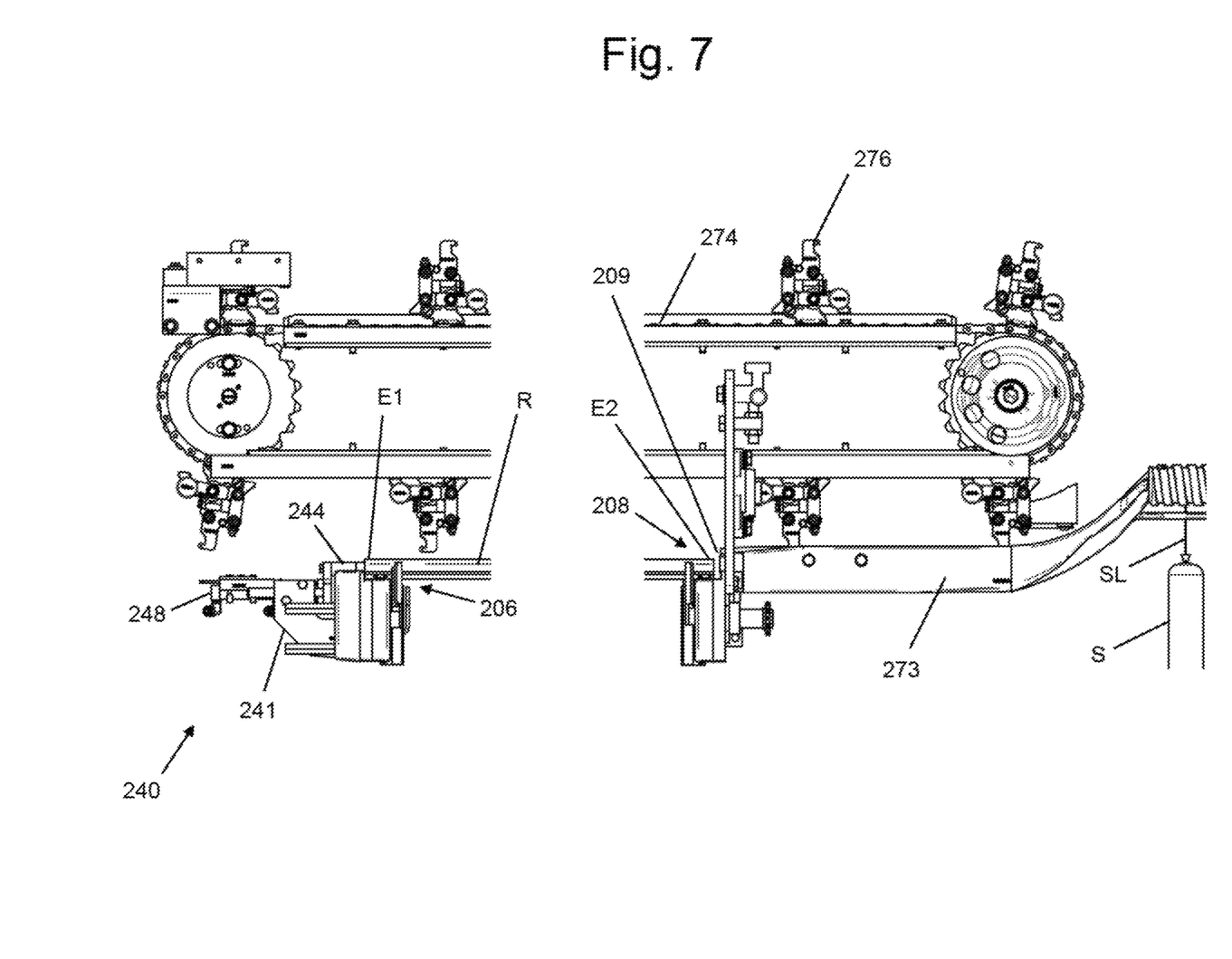
FIG. 7: is a side view showing of some of the components of FIG. 6 in an enlarged scale.
Figure 8:
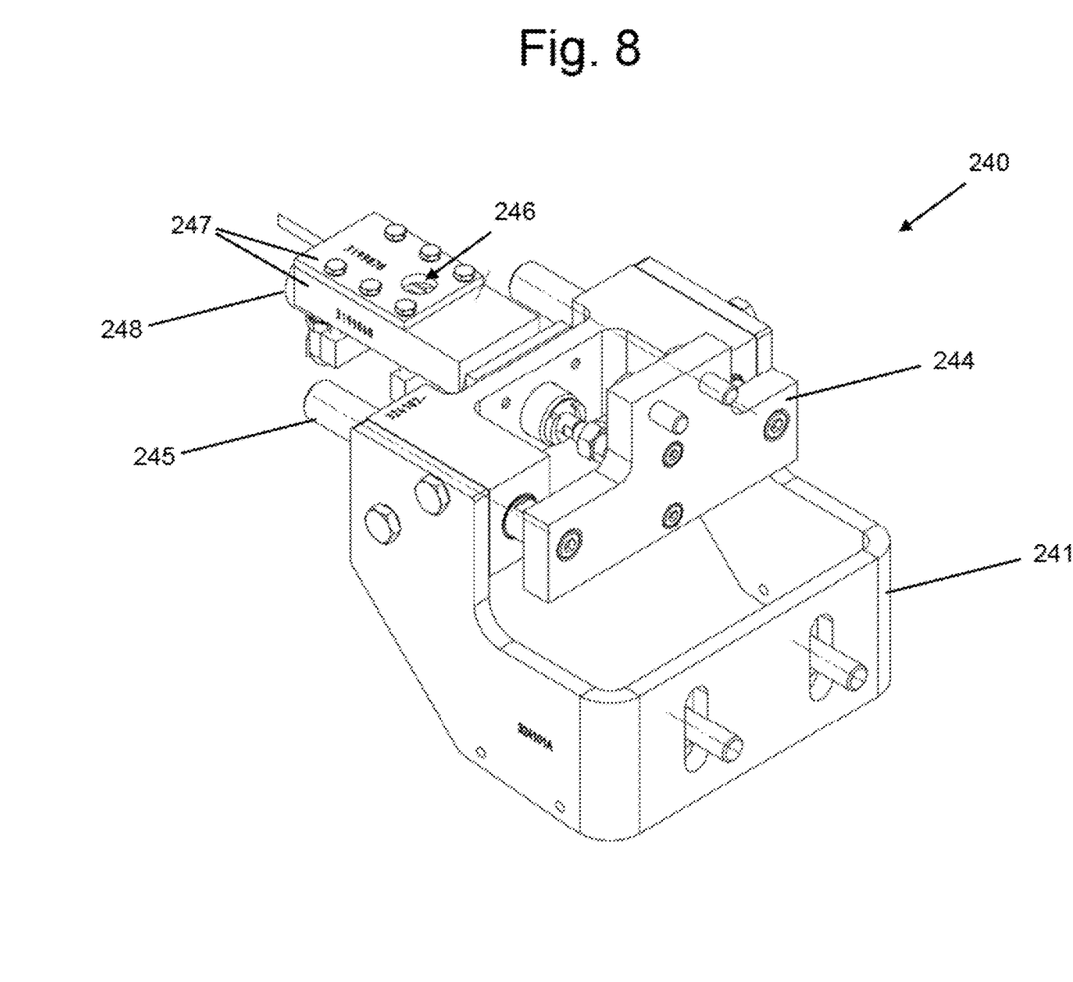
FIG. 8: is a perspective view showing a sensor device according to the invention.

According to a first embodiment, magazine 210 comprises a first support element 202 configured to receive the first end E1 of a rod-like element R and a second support element 204 configured to receive the second end E2 of the rod-like element R. The first and second support elements 202, 204 define a measuring position. Support elements 202, 204 are each arranged directly below slots 218, so that a rod-like element leaving slots 218 is fed onto support elements 202, 204 into a measuring position. In FIG. 4, only the location of support element 202 of wall 212 is indicated, while support element 204 is located in the opposite wall 214. Support elements 202, 204 may be configured as explained in connection with FIG. 7 below. A sensor device as shown in FIG. 8 and described later can be arranged at one of the support elements 202, 204 for measuring the length of rod-like element R. An ejection lever (not shown) can be arranged to eject the rod-like element R from the support elements 202, 204 after measuring and move the ends (E1, E2) of rod-like element R into output slots (not shown) in walls 212, 214. The output slots each may include a slot switch (not shown) and divide in first and second output paths for outputting the rod-like element R. Such slot switches per-se are well-known. The first output path leads to support elements 202, 204 of the loading position of hanging line 200, while the second output path leads out of magazine 210 and hanging line 200 so that the rod-like element R can be discarded and received in a reject bin 900 located beneath magazine 210, for example.

In the following, a method of operating the first embodiment is described. In a first step, one of the rod-like elements R is fed by magazine 210 from slots 218 to the measuring position formed by support elements 202, 204. In a second step, the length L of that rod-like element R is measured by sensor device 240. In a third step, sensor device 240 generates an electric signal which is used by control unit 160 to determine the length L. In a fourth step, control unit 160 determines whether the length L is within a predetermined tolerance range of a desired length Ld. If it is determined in the fourth step that the length L is within the tolerance range of Ld, the processing advances to a fifth step, in which the rod-like element R is transferred via the first output path of magazine 210 to the loading position defined by third and fourth support elements 206, 208 of hanging line 200 and a predetermined number of the produced sausage-shaped products S is loaded on the rod-like element R (as described later herein and shown in FIGS. 6 and 7), whereupon the filled rod-like element R is removed from the loading position and transferred to the output position by outfeed device 220. The processing then returns to the first step.

However, in case it is determined in the fourth step that the length L is not within the tolerance range of Ld, the processing advances to a sixth step, in which the rod-like element R is discarded and transferred via the second output path out of hanging line 200 and, for example, into the reject bin 900. The processing then returns to the first step.

In the following, a second embodiment of the invention is described with reference to FIGS. 5 to 7. The second embodiment differs from the first embodiment in that magazine 210 does not include the measuring position with first and second support elements 202, 204, the sensor device 240 and the slot switches and first and second output paths as described above. Instead, magazine 210 includes only one output path leading to the loading position of hanging line 200.

Figure 5:
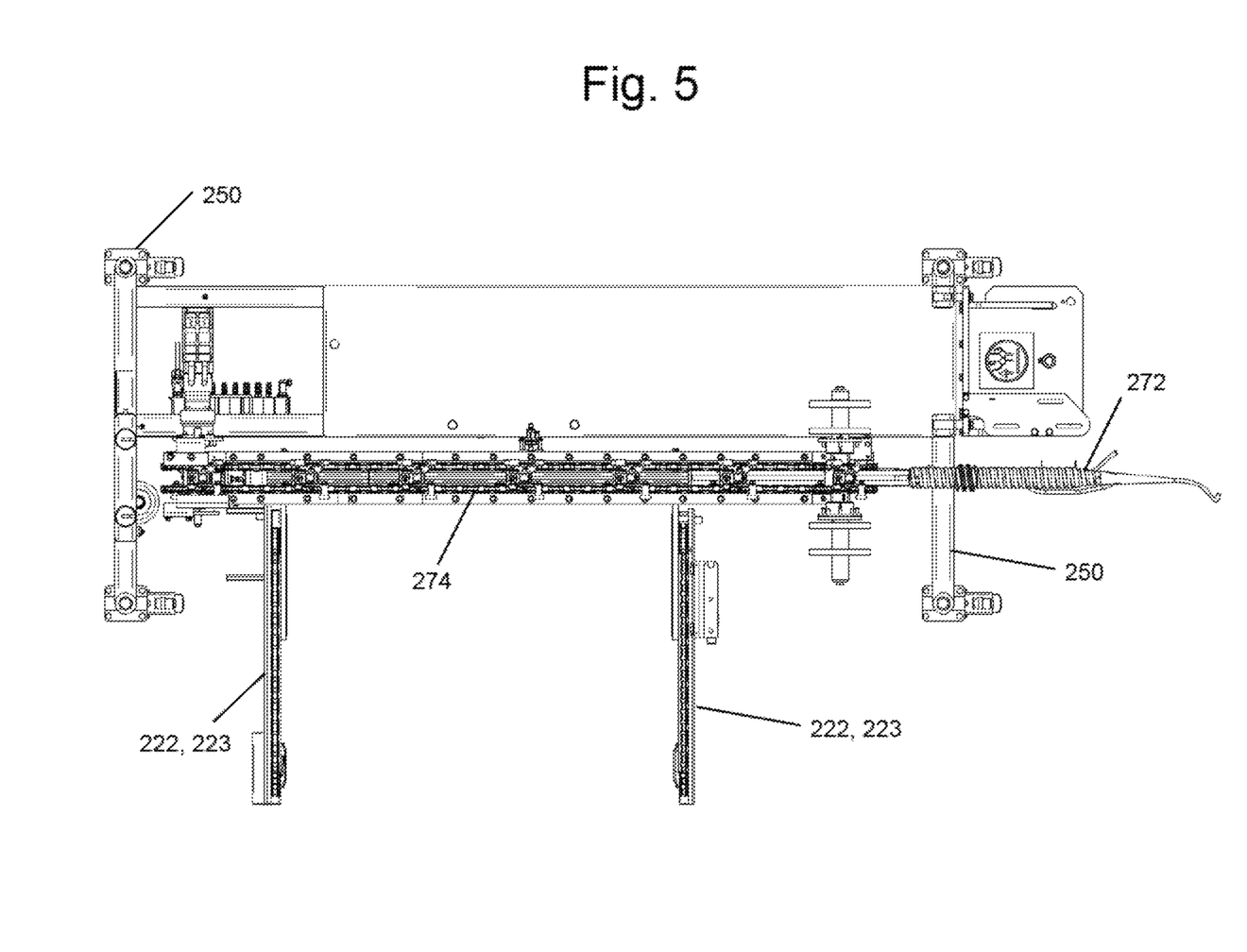
FIG. 5: is a top view showing main components of a hanging line according to a second embodiment of the invention.
Figure 6:
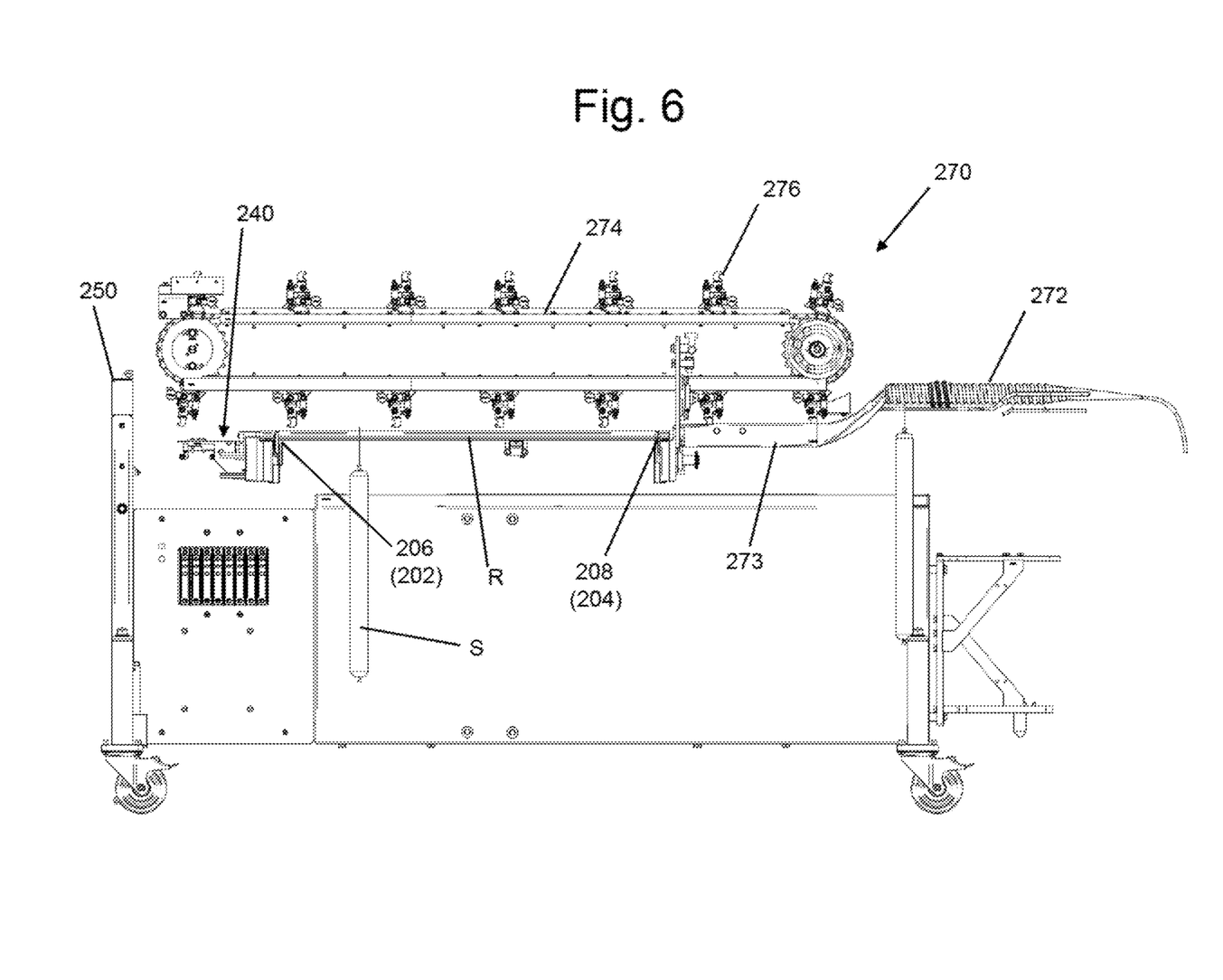
FIG. 6: is a side view of the hanging line of FIG. 5.

FIG. 5 is a top view showing the main components of hanging line 200, and FIG. 6 is a side view of the hanging line 200 of FIG. 5. FIGS. 5 and 6 particularly show the loading device 270 which is supported by frame 250 of hanging line 200 and located at the inner ends of rails 222 of the outfeed device 220 and above a rod-like element R placed in the loading position. Loading device 270 per se is well-known and can have different configurations. Loading device 270, as shown, comprises a transfer device 272 and a circulating loading chain 274 carrying engagement elements 276.

Additionally, loading device 270 comprises third and fourth support elements 206, 208 defining a loading position and being configured to support first and second ends E1, E2 of rod-like element R. In the second embodiment, third and fourth support elements 206, 208 also serve as, i.e. are identical to or one and the same with, first and second support elements 202, 204. In other words, in the second embodiment, the loading position defined by third and fourth support elements 206, 208 is also used as the measuring position for measuring the length L of the rod-like element R. To this purpose, sensor device 240 is attached to third support element 206.

Transfer device 272 is configured to catch suspension loop SL of the sausage-like product S leaving clipping machine 100, and to deliver suspension loop SL via a slip 273 to rod-like element R resting with its second end E2 on fourth support element 208. While sliding on slip 271, suspension loop SL is engaged by engagement elements 276 circulating with chain 274, and thus, moved over the left end of slip 273 onto rod-like element R. Fourth support element 208 is attached to the left end of slip 273, as is best shown in FIG. 7, and retains second end E2 of rod-like element R in lateral directions aligned with slip 273. Moreover, second end E2 of rod-like element R should abut to the end surface of slip 273, which end surface is a stop 209 of fourth support element 208, so as to avoid any gap between rod-like element R and slip 273 for ensuring smooth transition of suspension loop SL. This alignment of rod-like element R with stop 209 of support element 208 advantageously can be performed by a pushing element 242 of sensor element 240 described below.

Figure 9:
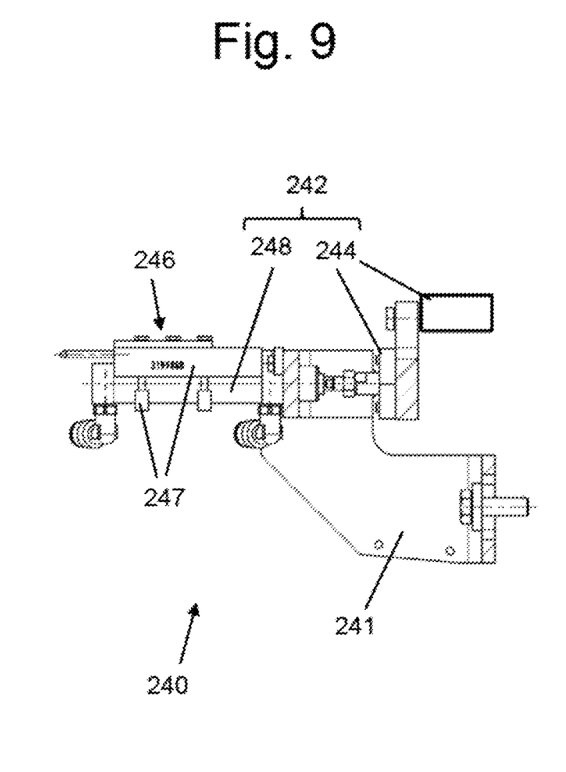
FIG. 9: is a longitudinal cross-section of the sensor device of FIG. 8.
Figure 10:
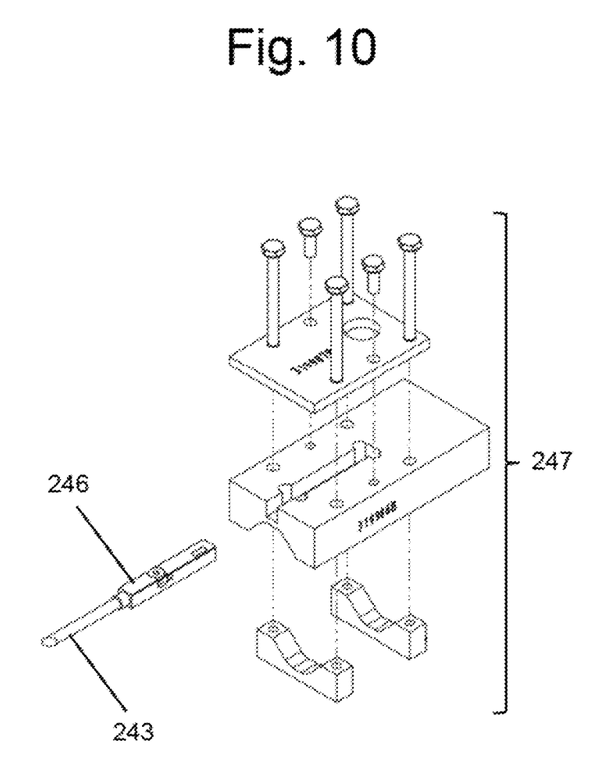
FIG. 10: is an explosive view of a mounting arrangement of the sensor of the sensor device of FIG. 8.

An exemplary embodiment of sensor element 240 is described in the following with respect to FIGS. 8 to 10. Sensor element 240 comprises a frame 241 to be fixedly attached with respect to third support element 206, and a pushing device 242 carried by frame 241. Pushing device 242 comprises a ram 244 guided in the axial direction of axis A of rod-like element R by a linear feed 245 having posts guided in longitudinal holes of frame 241 (see FIG. 8). In FIG. 8, ram 244 is shown without a contact element, while in FIG. 9, a contact element, preferable made of plastic or hard rubber or the like, is attached to the front face of ram 244 which is intended to engage first end E1 of rod-like element R. ram 244 is coupled via a piston rod with a piston (not shown) of a pneumatic cylinder 248, so that ram 244 can be moved in the direction of axis A of rod-like element R. Pneumatic cylinder 248 is attached to frame 241. A clamping device 247 is attached to pneumatic cylinder 248 such that it encloses and clamps a sensor 246 to a location in the vicinity of pneumatic cylinder 248 which is mad of non-magnetic material, so that sensor 246 can detect a magnetic field generated by a magnetic element included in the piston or the piston rod of pushing device 242. For example, sensor 246 is a Hall-Sensor or a magneto-resistive sensor or the like, and depending on the position of the magnetic element contained in the piston or in the piston rod of pushing element 242, sensor 246 generates a varying electrical signal. Control unit 160 can then receive this electrical signal from sensor 246 a cable 243 and determine the position of the piston based on the electrical signal. Thus, also the position of ram 244 can be determined, and since the fixed distance between third and fourth support elements 206, 208 is known, control unit 160 can calculate the actual distance between the end face of the contact element of ram 244 and the surface of stop 209 of fourth support element 208. This distance corresponds to the length L of rod-like element R placed in the loading (or measuring) position when ram 244 pushes against first end E1 of rod-like element R and second end E2 of the same abuts on (i.e. is aligned with) stop 209. Thus, length L of rod-like element R can be determined.

In this manner, sensor element 240 is capable of performing two functions simultaneously, namely aligning second end E2 of rod-like element R with stop 209 and slip 273, respectively, as well as measuring the length L of rod-like element R.

It must be noted, that the invention is not restricted to a magnetic sensor. Instead, also other position sensors can be used, such as optical sensors. Moreover, the invention is not restricted to pushing device 242 having pneumatic cylinder 248, but can also be implemented with a ram 244 driven electrically such as by a solenoid or the like. Sensor device 240 described above can be used in the above described first embodiment, when attached to first support element 202. In this case, second support element 204 also has a stop similar to stop 209 of fourth support element 208.

In the following, a method of operating the second embodiment is described. In a first step, one of the rod-like elements R is fed by magazine 210 to the measuring position, which in this case corresponds to the loading position defined by third and fourth support elements 206, 208. In a second step, the length L of that rod-like element R is measured by sensor device 240, while aligning rod-like element to stop 209 of fourth support element 208 at slip 273. In a third step, sensor device 240 generates an electric signal which is used by control unit 160 to determine the length L. In a fourth step, control unit 160 determines whether the length L is within a predetermined tolerance range of a desired length Ld. If it is determined in the fourth step that the length L is within the tolerance range of Ld, the processing advances to a fifth step, in which a predetermined number of the produced sausage-shaped products S is loaded on the rod-like element R by loading device 270, whereupon the filled rod-like element R is removed from the loading position and transferred to the output position by outfeed device 220. The processing then returns to the first step.

However, in case it is determined in the fourth step that the length L is not within the tolerance range of Ld, the processing advances to a sixth step, in which the rod-like element R is discarded and transferred to the output position by outfeed device 220, whereupon the discarded rod-like element R must be removed either by a user or by robot 300. The processing then returns to the first step.

In case the discarded rod-like element R is manually removed by a user, the system can stop the clipping machine and/or the hanging line until the user confirms removal of the discarded rod-like element R. This avoids that sausage-like products S are produced which cannot be moved further along the production process. In case the system comprises the handling robot 300, the discarded rod-like element R can be removed from the output position of outfeed device 220 by robot 300, and can be placed in the reject bin 900, for example. Thus, the production process can be smoothly continued.

Since control unit 160 of production line 3 determines the length of rod-like element R, this length can be used by handling robot 300 to optimize the placing position of rod-like element R on storage frame 400. In particular, control device 160 can transmit the value of length L of rod-like element R currently presented in the output position of outfeed device 220 to control unit 310 of handling robot 300. Simultaneously, the longitudinal position of rod-like element R in the output position is well defined due to the alignment of rod-like element R in the loading position, if it is assumed that during the outfeed operation of outfeed device the axial position is not considerably changed. It is also possible, to provide a further alignment device (not shown) at the output position to ensure a well defined axial position of rod-like element R. In this way, handling robot 300 is able to grip rod-like element R at the output position in a well known distance from both ends E1, E2 of rod-like element R, so that the handling robot 300 is further able to place rod-like element R perpendicular to and on support bars 402, 404 of storage frame 400 such that both ends E1, E2 overlap support bars 402, 404 by the same amount. In other words, handling robot 300 can place rod-like element R centred on support bars 402, 404. This improves stability of the position of rod-like element R in storage frame 400 and reduces the risk of slipping off from the support bars 402, 404 when storage frame 400 is subject to vibrations or shock.

Sensor device 240 attached to one of the support elements of the loading position can also be added to hanging lines 200 already in operation, so that all the advantages described above can be added to older systems when control unit 160 of production line 3 and, if applicable, control unit 310 of handling robot 300 are reprogrammed accordingly so as to perform the methods of the invention.

LIST OF REFERENCE SIGNS

A center axis of rod-like element
C closure clip
E1 first end of rod-like element
E2 second end of rod-like element
F feeding direction
M casing material
P plait-like portion
R rod-like element
S sausage-shaped product
SL suspension loop
T transfer direction
1 system
3 production line
10 filling tube
12 downstream end of filling tube
14 upstream end of filling tube
100 clipping machine
116 casing brake
120 clipping device
122 punch
124 die
130 gathering means
132 first displacer unit
134 second displacer unit
150 conveying device
160 control unit of production line
200 hanging line
202 first support element
204 second support element
206 third support element
208 fourth support element
209 stop
210 magazine
212 upstream wall
214 downstream wall
216 slots
218 single slot
220 outfeed device
222 rail
223 outfeed chain
224 output position
240 sensor device
241 frame of sensor device
242 pushing device
243 cable
244 ram
245 linear feed
246 sensor
247 clamping device
248 pneumatic cylinder
250 frame of hanging line
270 loading device
272 transfer device
273 slip
274 loading chain
276 engagement element
300 handling robot
310 control unit of handling robot
400 storage frame 402 support bar
404 support bar
900 reject bin

The invention claimed is:

1. A method for handling longitudinal rod-like elements, in particular smoking rods, for storing sausage-shaped products, in particular sausages, in a system for producing and handling the sausage-shaped products, wherein the method comprises the steps of:
provide a plurality of the rod-like elements, each rod-like element having a length defined between a first end and a second end;
providing a clipping machine configured to produce the sausage-shaped products;
providing a hanging line configured to load the produced sausage-shaped products on the rod-like elements and comprising a measuring position for receiving the rod-like elements and for measuring the length of the rod-like elements, and a loading position for receiving the rod-like elements and for loading the produced sausage-shaped products (S) on the rod-like elements;
feeding one of the rod-like elements to the measuring position of the hanging line;
measuring the length of said one of the rod-like elements;
determining whether the length is within a tolerance range of a desired length;
providing said one of the rod-like elements in the loading position of the hanging line and loading a predetermined number of the produced sausage-shaped products on said one of the rod-like elements, if the length is within the tolerance range;
discarding said one of the rod-like elements from the hanging line, if the length is not within the tolerance range.

2. The method of claim 1, wherein the hanging line further comprises a magazine for holding available the plurality of the rod-like elements, wherein the measuring position of the hanging line is located within the magazine, and wherein the step of discarding comprises removing the one of the rod-like elements from the measuring position directly into a reject bin.

3. The method of claim 1, wherein in the hanging line the measuring position and the loading position are one and the same, so that the step of measuring is performed with the one of the rod-like elements placed in the loading position.

4. The method of claim 3, wherein the hanging line further comprises an outfeed device, and wherein the method further comprises the step of moving the one of the rod-like elements by the outfeed device from the loading position to an output position.

5. The method of claim 4, wherein the step of discarding comprises removing the one of the rod-like elements from the output position.

6. The method of claim 1, wherein the step of discarding further comprises stopping the operation of the clipping machine until a next one of the rod-like elements has been placed in the loading position of the hanging line and its length has been determined to be within the tolerance range.

7. The method of claim 6, wherein the step of discarding further comprises deferring the step of feeding the next one of the rod-like elements to the loading position of the hanging line until a user manually removes the discarded rod-like element and confirms the removal to the system.

8. The method of claim 1, wherein the system further comprises a handling robot configured to grip and move the one of the rod-like elements, wherein the handling robot grips the rod-like element, which is loaded with the predetermined number of the produced sausage-shaped products, and places the rod-like element in a storage frame, if the length is within the tolerance range;
wherein the step of discarding further comprises removing the discarded rod-like element and placing the same in a reject bin by the handling robot.

9. The method of claim 8, wherein the storage frame comprises two support bars having a distance smaller than the desired length, and wherein the handling robot places the one of the rod-like elements on the support bars and perpendicular to the same such that both ends overlap the support bars by the same amount, if the length is within the tolerance range.

10. A system for producing sausage-shaped products, like sausages, containing a flowable filling material in a tubular or bag-shaped packaging casing and a suspension element such as a suspension loop, and for loading the produced sausage-shaped products on rod-like elements such as smoking rods, each rod-like element having a length defined between a first end and a second end; the system comprising:
a clipping machine configured to produce the sausage-shaped products;
a hanging line configured to load the produced sausage-shaped products on the rod-like elements; and
a control unit controlling the operation of the clipping machine and the hanging line;
wherein the hanging line comprises:
a first support element configured to receive the first end of one of the rod-like elements and a second support element configured to receive the second end of the one of the rod-like elements, the first and second support elements defining a measuring position; and
a third support element configured to receive the first end of the one of the rod-like elements and a fourth support element configured to receive the second end of the one of the rod-like elements, the third and fourth support elements defining a loading position for loading the produced sausage-shaped products on the rod-like elements;
a sensor device arranged at the measuring position and configured to measure the length of the one of the rod-like elements placed in the measuring position;
wherein the control unit is configured to compare the length with a desired length and to determine whether the length is within a tolerance range of the desired length, and wherein the control unit further causes the hanging line to load a predetermined number of sausage-shaped products on the one of the rod-like elements if the length is within the tolerance range, and causes discarding the one of the rod-like elements if the length is not within the tolerance range.

11. The system of claim 10, wherein the hanging line further comprises a magazine for holding available a plurality of the rod-like elements, wherein the first and second support elements defining the measuring position are located within the magazine, and wherein the magazine is configured to successively feed single rod-like elements first to the measuring position and then to the loading position or to a reject bin.

12. The system of claim 10, wherein the first and third support elements are one and the same and the second and fourth support elements are one and the same, so that the measuring position is identical with the loading position and the sensor device is arranged at the loading position; and wherein the hanging line further comprises an outfeed device configured to move the one of the rod-like elements from the loading position to an output position.

13. The system of one of claim 10, further comprising
   a storage frame having two support bars with a distance smaller than the desired length for carrying a plurality of the rod-like elements; and
   a handling robot configured to grip the one of the rod-like elements and to place it on the support bars of the storage frame or in a reject bin;
   wherein the handling robot is further configured to receive the measured length of the one of the rod-like elements from the control unit and to adjust the placing position of the one of the rod-like elements on the support bars such that both ends overlap the support bars by the same amount.

14. The system of claim 10, wherein
   the sensor device comprises a pushing device arranged at the third support element and having a ram configured to push against the first end in a longitudinal direction of the one of the rod-like elements, so that the second end becomes aligned with the fourth support element having a stop;
   wherein the pushing device comprises a sensor configured to detect a position of the ram and to generate an output signal depending on the position of the ram; and
   wherein the control unit is configured to receive the output signal of the sensor and to determine the length of the one of the rod-like elements based on the signal when the second end is aligned with the fourth support element.

15. The system of claim 14, wherein the pushing device comprises a pneumatic cylinder fixedly attached with respect to the third support element and a piston having a magnetic element and coupled to the ram, and wherein the sensor is a magnetic sensor, in particular a Hall-Sensor, attached to the pneumatic cylinder and configured to detect an axial position of the piston.

* * * * *